(12) United States Patent
Angello et al.

(10) Patent No.: US 11,867,397 B2
(45) Date of Patent: Jan. 9, 2024

(54) GAS TURBINE

(71) Applicant: Electric Power Research Institute, Inc., Palo Alto, CA (US)

(72) Inventors: Leonard Charles Angello, Mountain View, CA (US); Benjamin Emerson, East Point, GA (US); Timothy Charles Lieuwen, Atlanta, GA (US); David Robert Noble, Vale, NC (US); Jared Kee, Atlanta, GA (US)

(73) Assignee: ELECTRIC POWER RESEARCH INSTITUTE, INC., Palo Alto, CA (US)

( * ) Notice: Subject to any disclaimer, the term of this patent is extended or adjusted under 35 U.S.C. 154(b) by 1188 days.

(21) Appl. No.: 16/409,248

(22) Filed: May 10, 2019

(65) Prior Publication Data
US 2020/0355368 A1 Nov. 12, 2020

(51) Int. Cl.
*F23N 5/24* (2006.01)
*F01D 21/00* (2006.01)

(52) U.S. Cl.
CPC ........... *F23N 5/242* (2013.01); *F01D 21/003* (2013.01); *F05D 2260/80* (2013.01); *F05D 2270/303* (2013.01); *F05D 2270/802* (2013.01); *F23N 2223/04* (2020.01); *F23N 2225/08* (2020.01);
(Continued)

(58) Field of Classification Search
CPC .. F23N 5/242; F23N 2223/04; F23N 2225/08; F23N 2227/20; F23N 2241/20; F01D 21/003; F01D 17/085; F05D 2260/80; F05D 2270/303; F05D 2270/802; F05D 2260/962; F05D 2260/964; F05D 2270/083; F05D 2270/14; F02C 9/28; F23R 2900/00013
See application file for complete search history.

(56) References Cited

U.S. PATENT DOCUMENTS

| 3,946,364 A | 3/1976 | Codomo et al. |
| 4,058,975 A | 11/1977 | Gilbert et al. |
| 5,024,055 A | 6/1991 | Sato et al. |

(Continued)

FOREIGN PATENT DOCUMENTS

EP 1 632 718 A2 3/2006

OTHER PUBLICATIONS

International Search Report for Application No. PCT/US2020/032276 dated Aug. 26, 2020.
(Continued)

*Primary Examiner* — J. Todd Newton
(74) *Attorney, Agent, or Firm* — Curatolo Sidoti & Trillis Co., LPA; Salvatore A. Sidoti; Floyd Trillis, III

(57) ABSTRACT

A non-transitory computer readable medium with instructions stored thereon, the instructions executable by one or more processors for selecting infrequent or frequent autotuning of a combustor; and determining the health of a combustor. Also, a method of monitoring a combustor within a gas turbine engine system, comprising providing a gas turbine engine system, wherein the gas turbine engine includes an autotuning system; selecting infrequent or frequent autotuning of the combustor; and determining the health of the combustor; wherein said determining the health of a combustor comprises receiving real-time fuel gas temperature data from at least one thermocouple.

18 Claims, 3 Drawing Sheets

(52) U.S. Cl.
CPC ...... *F23N 2227/20* (2020.01); *F23N 2241/20* (2020.01)

(56) References Cited

U.S. PATENT DOCUMENTS

| | | | |
|---|---|---|---|
| 6,598,195 B1* | 7/2003 | Adibhatla | G01D 3/08 |
| | | | 714/25 |
| 6,741,919 B1* | 5/2004 | Schuster | G05B 9/02 |
| | | | 701/29.9 |
| 6,789,390 B2 | 9/2004 | Hu et al. | |
| 6,983,603 B2 | 1/2006 | Macchia | |
| 7,322,794 B2 | 1/2008 | LeMieux et al. | |
| 7,369,932 B2 | 5/2008 | Kim et al. | |
| 7,369,965 B2 | 5/2008 | Mylaraswamy et al. | |
| 7,395,188 B1 | 7/2008 | Goebel et al. | |
| 7,503,177 B2 | 3/2009 | Bland et al. | |
| 7,715,991 B2 | 5/2010 | Potdar et al. | |
| 7,725,293 B2 | 5/2010 | Bonissone et al. | |
| 7,734,400 B2 | 6/2010 | Gayme et al. | |
| 7,933,754 B2 | 4/2011 | Goebel et al. | |
| 8,125,646 B2 | 2/2012 | Lopushansky et al. | |
| 9,752,960 B2* | 9/2017 | Angello | F23N 5/242 |
| 9,765,702 B2* | 9/2017 | Gauthier | F02C 9/00 |
| 9,909,508 B2 | 3/2018 | Jaiven et al. | |
| 2002/0005037 A1* | 1/2002 | Tegel | F01D 17/08 |
| | | | 60/772 |
| 2004/0211187 A1* | 10/2004 | Catharine | F02C 9/00 |
| | | | 60/39.281 |
| 2005/0021212 A1 | 1/2005 | Gayme et al. | |
| 2006/0041368 A1 | 2/2006 | Williams et al. | |
| 2006/0042261 A1* | 3/2006 | Taware | F23N 5/003 |
| | | | 60/773 |
| 2007/0062196 A1* | 3/2007 | Gleeson | F23N 5/242 |
| | | | 60/722 |
| 2007/0214796 A1* | 9/2007 | Bland | F01D 21/003 |
| | | | 60/804 |
| 2007/0239633 A1 | 10/2007 | Dietrich et al. | |
| 2007/0260390 A1 | 11/2007 | Kim et al. | |
| 2008/0010966 A1 | 1/2008 | Taware et al. | |
| 2009/0005952 A1 | 1/2009 | Tonno et al. | |
| 2010/0076698 A1 | 3/2010 | He et al. | |
| 2011/0040469 A1 | 2/2011 | Singh et al. | |
| 2012/0275899 A1 | 11/2012 | Chandler | |
| 2014/0020400 A1* | 1/2014 | Ceccherini | F02C 9/00 |
| | | | 60/773 |
| 2018/0073970 A1 | 3/2018 | Hagen | |
| 2018/0112601 A1* | 4/2018 | Li | G01H 1/003 |
| 2020/0165995 A1* | 5/2020 | Moeckly | B64D 31/00 |

OTHER PUBLICATIONS

International Written Opinion for Application No. PCT/US2020/032276 dated Aug. 26, 2020.
EP 11876073.5—European Search Report, dated May 29, 2015.
PCT/US2011/061879—International Search Report, dated Aug. 3, 2012.
PCT/US2011/061879—International Written Opinion, dated Aug. 3, 2012.
PCT/US2011/061879—International Preliminary Report on Patentability, dated May 27, 2014.
Stambler, Irwin "Early warning detection to prevent combustor failures", Gas Turbine World, pp. 20-25, Jul.-Aug. 2009.
Stambler, Irwin "Diagnostic health monitoring will reduce new technology O&M risk", Gas Turbine World, pp. 28-31, Jan.-Feb. 2006.
Ratliff, Phil, et al. "The New Siemens Gas Turbine SGT5-8000H for More Customer Benefit", VGB PowerTech, pp. 128-132, Sep. 2007.
Kim, Kyusung "Fault diagnosis and prognosis for fuel supply systems in gas turbine engines", Journal of Mechanical Engineering Science, pp. 757-768, Proc. IMechE, vol. 223, Part C, Mar. 1, 2009.

* cited by examiner

GAS TURBINE

Advanced combustion dynamics monitoring algorithms (CDM algorithms) have the capability to detect the precursors of combustion system hardware faults in gas turbine engines. These faults are extremely high consequence events, easily causing $10M+ failures when they occur. CDM algorithms identify variations in the dynamics signatures of the combustors to proactively detect precursors to these events, as described in, for example, U.S. Pat. No. 9,752,960. As discussed in that patent, health of combustion components may be inferred using CDM data. Since the development of that algorithm, gas turbine engines are increasingly outfitted with autotuning systems. The autotuning systems naturally tune away the variations in dynamics signatures that the CDM algorithm aims to detect, by altering, for example, the fuel splits to a combustor or combustors. This necessitates an evolution in CDM algorithms to incorporate the activities of the autotuning system and thus maintain the capability to detect fault precursors. This disclosure presents subject matter related to new CDM algorithms to fulfill this need.

The results and advantages of the present algorithms are that it will enable combustion dynamics monitoring to continue to detect combustion system fault precursors for systems with autotuning. This allows issues to be detected before they trip the plant and/or cause an unplanned outage.

Provided is a non-transitory computer readable medium with instructions stored thereon, the instructions executable by one or more processors for selecting infrequent or frequent autotuning of a combustor; and determining the health of a combustor.

Also disclosed is a method of monitoring a combustor within a gas turbine engine system, comprising providing a gas turbine engine system, wherein the gas turbine engine includes an autotuning system; selecting infrequent or frequent autotuning of the combustor; and determining the health of the combustor; wherein said determining the health of a combustor comprises receiving real-time fuel gas temperature data from at least one thermocouple.

Embodiments of the subject matter are disclosed with reference to the accompanying drawings and are for illustrative purposes only. The subject matter is not limited in its application to the details of construction or the arrangement of the components illustrated in the drawings. As used herein, "at least one" means one or more than one, and "and/or" means items listed may be included exclusively or in combination. Like reference numerals are used to indicate like components, unless otherwise indicated.

FIG. 1 is a block diagram showing the instructions the non-transitory computer readable medium.

The following embodiments of the present subject matter are contemplated:

1. A non-transitory computer readable medium with instructions stored thereon, the instructions executable by one or more processors for:
   selecting infrequent or frequent autotuning of a combustor; and
   determining the health of a combustor.
2. The non-transitory computer readable medium of embodiment 1, wherein said determining the health of a combustor comprises receiving real-time combustor fuel split data and fuel gas temperature data.
3. The non-transitory computer readable medium of embodiment 2, wherein said determining the health of a combustor comprises comparing the real-time combustor fuel split data and fuel gas temperature data with data in a reference database, wherein the reference database comprises at least one data set selected from the group consisting of normalized load data, wheelspace temperature data, compressor discharge temperature data, dynamics amplitude data, and dynamics frequency data.
4. The non-transitory computer readable medium of embodiment 3, wherein said determining the health of a combustor comprises comparing the real-time combustor fuel split data and fuel gas temperature data with data in a reference database, wherein the reference database comprises normalized load data, wheelspace temperature data, compressor discharge temperature data, dynamics amplitude data, and dynamics frequency data.
5. The non-transitory computer readable medium of any one of embodiments 1 to 4, wherein infrequent autotuning is selected.
6. The non-transitory computer readable medium of embodiment 5, wherein said determining the health of a combustor comprises comparing real time combustion dynamics data and fuel split data with a reference database.
7. The non-transitory computer readable medium of embodiment 6, wherein the reference database is configured to be updated by real time combustion dynamics data and fuel split data.
8. The non-transitory computer readable medium of any one of embodiments 1 to 7, wherein frequent autotuning is selected.
9. The non-transitory computer readable medium of embodiment 8, wherein said determining the health of a combustor comprises comparing real time fuel split data with a fuel split reference database.
10. The non-transitory computer readable medium of embodiment 9, wherein said comparing real time fuel split data with a fuel split reference database comprises selecting data for comparison from the fuel split reference database wherein the combustor exhibited at least one data set similar to data selected from the group consisting of normalized load data, wheelspace temperature data, compressor discharge temperature data, dynamics amplitude data, and dynamics frequency data.
11. The non-transitory computer readable medium of any one of embodiments 1 to 10, wherein said determining the health of a combustor comprises outputting a single number H, wherein H is indicative of the overall health of the combustor.
12. The non-transitory computer readable medium of any one of embodiments 1 to 11, wherein the non-transitory computer readable medium is configured to be switchable between infrequent or frequent autotuning of a combustor.
13. A computer system comprising at least one microprocessor coupled to memory and the non-transitory computer readable medium of any one of embodiments 1 to 12.
14. The computer system of embodiment 13, wherein the computer system is configured to receive input data from at least one thermocouple.
15. The computer system of embodiment 14, wherein the computer system is configured to receive input data from a plurality of thermocouples.
16. A gas turbine system comprising an autotuning system and the computer system of any one of embodiments 13 to 15.

17. A method of monitoring a combustor within a gas turbine engine system, comprising:
   providing a gas turbine engine system, wherein the gas turbine engine includes an autotuning system;
   selecting infrequent or frequent autotuning of the combustor; and
   determining the health of the combustor;
   wherein said determining the health of a combustor comprises receiving real-time fuel gas temperature data from at least one thermocouple.
18. The method of embodiment 17, wherein said determining the health of a combustor comprises receiving real-time combustor fuel split data.
19. The method of embodiment 18, wherein said determining the health of a combustor comprises comparing the real-time combustor fuel split data and fuel gas temperature data with data in a reference database, wherein the reference database comprises at least one data set selected from the group consisting of normalized load data, wheelspace temperature data, compressor discharge temperature data, dynamics amplitude data, and dynamics frequency data.
20. The method of embodiment 19, wherein said determining the health of a combustor comprises comparing the real-time combustor fuel split data and fuel gas temperature data with data in a reference database, wherein the reference database comprises normalized load data, wheelspace temperature data, compressor discharge temperature data, dynamics amplitude data, and dynamics frequency data.
21. The method of any one of embodiments 17 to 20, wherein infrequent autotuning is selected.
22. The method of embodiment 21, wherein said determining the health of a combustor comprises comparing real time combustion dynamics data and fuel split data with a reference database.
23. The method of embodiment 22, wherein the reference database is configured to be updated by real time combustion dynamics data and fuel split data.
24. The method of any one of embodiments 17 to 20, wherein frequent autotuning is selected.
25. The method of embodiment 24, wherein said determining the health of a combustor comprises comparing real time fuel split data with a fuel split reference database.
26. The method of embodiment 25, wherein said comparing real time fuel split data with a fuel split reference database comprises selecting data for comparison from the fuel split reference database wherein the combustor exhibited at least one data set similar to data selected from the group consisting of normalized load data, wheelspace temperature data, compressor discharge temperature data, dynamics amplitude data, and dynamics frequency data.
27. The method of any one of embodiments 17 to 26, wherein said determining the health of a combustor comprises outputting a single number H, wherein H is indicative of the overall health of the combustor.
28. The method of any one of embodiments 17 to 27, wherein the non-transitory computer readable medium is configured to be switchable between infrequent or frequent autotuning of a combustor.
29. The method of any one of embodiments 17 to 28, wherein said determining the health of a combustor comprises receiving real-time fuel gas temperature data from a plurality of thermocouples.

Provided is a non-transitory computer readable medium with instructions stored thereon, the instructions executable by one or more processors for: selecting infrequent or frequent autotuning of a combustor; and determining the health of a combustor. Infrequent or frequent autotuning may be selected by an operator based on experience with the gas turbine, age of the gas turbine, by the number of fuel split changes observed over a portion of time, or any combination of experience with the gas turbine, age of the gas turbine, and the number of fuel split changes observed over a portion of time. The health of a combustor may be one factor in the observable dynamics of a gas turbine combustion chamber. A quantitative health indicator may be representative of an identified anomaly within a gas turbine. According to certain embodiments, a health value may be generated and presented to the user as an output, which may be correlated with a potential cause of non-uniformity.

In certain embodiments, combustion dynamics monitoring systems collect dynamics data in the time domain. Time domain data may comprise pressure oscillations, electromagnetic radiation from the flame (e.g., chemiluminescence or thermal radiation), velocity oscillations, or some other observable related to combustion dynamics. Operational data may also be collected, for example, engine power, inlet guide vane angles, ambient temperature and other operational data. The related data may be acquired from, without limitation, combustion dynamics monitoring systems, other device data collection systems or directly from sensors associated with the devices.

In some embodiments, a quantitative health indicator may be indicative of an anomaly. A health indicator value may be generated for the amplitude and frequency of each spectral bin. For example, implementations in certain gas turbine engines generate four spectral bins: Low Frequency Dynamics (LFD), Intermediate Frequency Dynamics, 1 (IFD1), Intermediate Frequency Dynamics, 2 (IFD2), and High Frequency Data (HFD). A health indicator value, or non-uniformity parameter, may be determined for the amplitude and frequency of each of the four spectral bins yielding eight non-uniformity parameters associated with, for example, each combustion chamber.

An anomaly, or a health indicator, may be correlated with a potential cause. A health indicator, or non-uniformity parameter, may be used as a quantitative indicator, or as a threshold output such as high/low or high/medium/low. A large value of the indicator for a particular device may be used to make an assessment of device health, or may be considered in conjunction with other operational data. In an embodiment, other gas turbine engine operational data may include, for example, exit blade path spreads, or air-fuel premixer temperatures.

According to certain embodiments, determining the health of a combustor may comprises receiving real-time combustor fuel split data and fuel gas temperature data. In some embodiments, the fuel gas temperature may be up to about 150° C., such as up to about 149° C. In some embodiments, the fuel split may range from 0% to 100% fuel and 0% to 100% air, wherein the combination of fuel and air is 100%. In some embodiments, said determining the health of a combustor comprises comparing the real-time combustor fuel split data and fuel gas temperature data with data in a reference database, wherein the reference database comprises at least one data set selected from the group consisting of normalized load data, wheelspace temperature data, compressor discharge temperature data, dynamics amplitude data, and dynamics frequency data. Determining the health of a combustor may comprise comparing the real-time combustor fuel split data and fuel gas temperature data with data in a reference database, wherein the reference database consists of at least one data set selected from the group consisting of normalized load data, wheelspace temperature data, compressor discharge temperature data, dynamics amplitude data, and dynamics frequency data. In some embodiments, determining the health of a combustor comprises comparing the real-time combustor fuel split data and fuel gas temperature data with data in a reference database, wherein the reference database comprises normalized load data, wheelspace temperature data, compressor discharge temperature data, dynamics amplitude data, and dynamics frequency data. Determining the health of a combustor may comprise comparing the real-time combustor fuel split data and fuel gas temperature data with data in a reference database, wherein the reference database consists of the data sets: normalized load data, wheelspace temperature data, compressor discharge temperature data, dynamics amplitude data, and dynamics frequency data. Wheelspace temperature and compressor discharge temperature may be collected with the use of a thermocouple. Dynamics amplitude and dynamics frequency data may be collected with the use of pressure sensors, and transformed from the time domain to the frequency domain via fast Fourier transform of the data. Normalized load may be the percentage of output power of the turbine at a given set of operating conditions divided by its maximum output power under the same operating conditions.

According to certain embodiments, infrequent autotuning may be selected. In some embodiments, determining the health of a combustor comprises comparing real time combustion dynamics data and fuel split data with a reference database. Combustion dynamics may be pressure waves of defined amplitudes and frequencies that are associated with the natural acoustic modes of the combustion system. For example, in the typical can-annular combustor of a large gas turbine, combustion dynamics may range in frequency from less than 50 Hz to several 1000 Hz. In terms of their impact on turbine components, dynamics of these frequencies can range from benign to highly destructive. Combustion instabilities in industrial gas turbines can produce intolerably large pressure waves, which lead to fatigue, detachment of components, costly outages and repair. Combustion dynamics may be compared to a reference database. The reference database may contain combustion dynamics data from the past, conditioned on operation parameters similar to current operational parameters. Fuel split data may be included in parallel with this operational data, ensuring that the system's autotuning by adjusting the fuel splits is taken into account. This compels the autotuning system to compare dynamics signatures for a similar tuning state.

The reference database may be configured to be updated by real time combustion dynamics data and fuel split data. According to certain embodiments, data may be streamed to the reference database or uploaded manually via batch upload. In some embodiments, a sliding window of user-defined, variable time determines the relevant values in the reference database as it is updated.

According to certain embodiments, frequent autotuning may be selected. When frequent autotuning is selected, determining the health of a combustor may comprise comparing real time fuel split data with a fuel split reference database. When frequent autotuning is selected, determining the health of a combustor may consist of comparing real time fuel split data with a fuel split reference database. In some embodiments, comparing real time fuel split data with a fuel split reference database comprises selecting data for comparison from the fuel split reference database wherein the combustor exhibited at least one data set similar to data selected from the group consisting of normalized load data, wheelspace temperature data, compressor discharge temperature data, dynamics amplitude data, and dynamics frequency data. In some embodiments, comparing real time fuel split data with a fuel split reference database comprises selecting data for comparison from the fuel split reference database, wherein the fuel split reference database includes data selected from the group consisting of normalized load data, wheelspace temperature data, compressor discharge temperature data, dynamics amplitude data, and dynamics frequency data. In some embodiments, comparing real time fuel split data with a fuel split reference database comprises selecting data for comparison from the fuel split reference database, wherein the fuel split reference database consists of normalized load data, wheelspace temperature data, compressor discharge temperature data, dynamics amplitude data, and dynamics frequency data. The autotuning algorithm may be, in a sense, somewhat inverted. The dynamics signatures may be used as inputs in parallel with operational data, and the algorithm compares current fuel splits from the past wherein the unit exhibited similar dynamics signatures with similar operation data.

In some embodiments, determining the health of a combustor comprises outputting a single number H, wherein H is indicative of the overall health of the combustor. Health, H, may be a measure of the deviation of combustor dynamics from observable norms given similar operating conditions. Given a populated reference database comprising load data, fuel splits, time of day, load ramp rate, and an observable parameter, which may be, for example, combustor temperature and/or pressure data, which may be a function of time and band, these parameters may be averaged over a given time window, $T_{avg}$. This averaging across a window can be smoothing the data. Typical variation of a given combustor, c, may be calculated from observable data, by determining the average observable for all combustors excluding c, determining the average observable for all combustors, and taking the difference. Heath, H, of a given combustor as a function of time, may be determined by comparing the observable data for a given combustor, given a sufficiently similar vector comprising at least one of load data, fuel splits, time of day, load ramp rate within a given lookback time, with the average, given the expected typical variation. The health determination may use the same equation/methodology as described in U.S. Pat. No. 9,752,960 B2; portions of U.S. Pat. No. 9,752,960 B2 which are pertinent to making the health determination are incorporated by reference herein as if fully written out below.

According to certain embodiments, H may be a function of the combustor and frequency band only. In some embodiments, the non-transitory computer readable medium is configured to be switchable between infrequent or frequent autotuning of a combustor. A computer system comprising at least one microprocessor coupled to memory may include the non-transitory computer readable medium, and be configured to execute the instructions thereon. In some embodiments, the computer system is configured to receive input data from at least one thermocouple. According to certain embodiments, the computer system may be configured to receive input data from a plurality of thermocouples. The computer system may be included within a gas turbine system with an autotuning system.

Also provided is a method of monitoring a combustor within a gas turbine engine system, comprising: providing a gas turbine engine system, wherein the gas turbine engine includes an autotuning system; selecting infrequent or frequent autotuning of the combustor; and determining the health of the combustor; wherein said determining the health of a combustor comprises receiving real-time fuel gas temperature data from at least one thermocouple.

Determining the health of a combustor may comprise receiving real-time combustor fuel split data. In some embodiments, the fuel gas temperature may be up to about 150° C., such as up to about 149° C. In some embodiments, the fuel split may range from 0% to 100% fuel and 0% to 100% air, wherein the combination of fuel and air is 100%. In some embodiments, said determining the health of a combustor comprises comparing the real-time combustor fuel split data and fuel gas temperature data with data in a reference database, wherein the reference database comprises at least one data set selected from the group consisting of normalized load data, wheelspace temperature data, compressor discharge temperature data, dynamics amplitude data, and dynamics frequency data. Determining the health of a combustor may comprise comparing the real-time combustor fuel split data and fuel gas temperature data with data in a reference database, wherein the reference database consists of at least one data set selected from the group consisting of normalized load data, wheelspace temperature data, compressor discharge temperature data, dynamics amplitude data, and dynamics frequency data. In some embodiments, determining the health of a combustor comprises comparing the real-time combustor fuel split data and fuel gas temperature data with data in a reference database, wherein the reference database comprises normalized load data, wheelspace temperature data, compressor discharge temperature data, dynamics amplitude data, and dynamics frequency data. Determining the health of a combustor may comprise comparing the real-time combustor fuel split data and fuel gas temperature data with data in a reference database, wherein the reference database consists of the data sets: normalized load data, wheelspace temperature data, compressor discharge temperature data, dynamics amplitude data, and dynamics frequency data.

According to certain embodiments, infrequent autotuning may be selected. When infrequent autotuning is selected, determining the health of a combustor may comprise comparing real time combustion dynamics data and fuel split data with a reference database. In some embodiments the reference database is configured to be updated by real time combustion dynamics data and fuel split data. According to certain embodiments, data may be streamed to the reference database or uploaded manually via batch upload. In some embodiments, a sliding window of user-defined, variable time determines the relevant values in the reference database as it is updated.

In some embodiments frequent autotuning is selected. When frequent autotuning is selected, determining the health of a combustor comprises comparing real time fuel split data with a fuel split reference database. According to certain embodiments, data may be streamed to the reference database or uploaded manually via batch upload. In some embodiments, a sliding window of user-defined, variable time determines the relevant values in the reference database as it is updated.

According to certain embodiments, comparing real time fuel split data with a fuel split reference database comprises selecting data for comparison from the fuel split reference database wherein the combustor exhibited at least one data set similar to data selected from the group consisting of normalized load data, wheelspace temperature data, compressor discharge temperature data, dynamics amplitude data, and dynamics frequency data. In some embodiments comparing real time fuel split data with a fuel split reference database comprises selecting data for comparison from the fuel split reference database wherein the combustor exhibited at least one data set similar to data selected from the group consisting of normalized load data, wheelspace temperature data, compressor discharge temperature data, dynamics amplitude data, and dynamics frequency data.

In some embodiments, comparing real time fuel split data with a fuel split reference database comprises selecting data for comparison from the fuel split reference database, wherein the fuel split reference database includes data selected from the group consisting of normalized load data, wheelspace temperature data, compressor discharge temperature data, dynamics amplitude data, and dynamics frequency data. In some embodiments, comparing real time fuel split data with a fuel split reference database comprises selecting data for comparison from the fuel split reference database, wherein the fuel split reference database consists of normalized load data, wheelspace temperature data, compressor discharge temperature data, dynamics amplitude data, and dynamics frequency data.

In some embodiments of the method, determining the health of a combustor comprises outputting a single number H, wherein H is indicative of the overall health of the combustor. According to certain embodiments, H may be a function of the combustor and frequency band only. In some embodiments, the non-transitory computer readable medium is configured to be switchable between infrequent or frequent autotuning of a combustor. A computer system comprising at least one microprocessor coupled to memory may include the non-transitory computer readable medium, and be configured to execute the instructions thereon. In some embodiments, the computer system is configured to receive input data from at least one thermocouple. According to certain embodiments, the computer system may be configured to receive input data from a plurality of thermocouples. The computer system may be included within a gas turbine system with an autotuning system.

Figure 1:
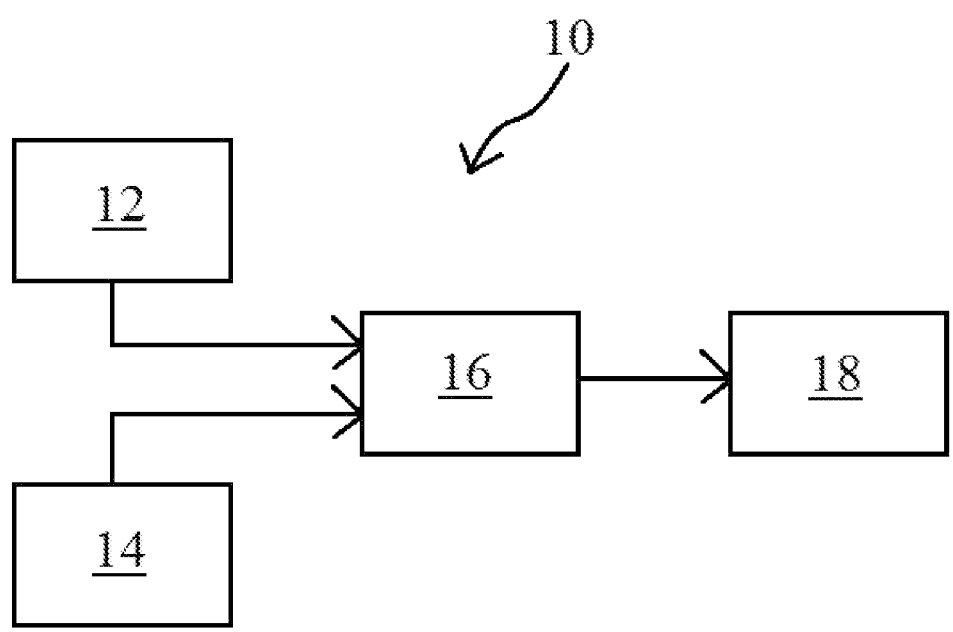
FIG. 1 is a block diagram showing the instructions 10 on the non-transitory computer readable medium. Input data 12, which may include fuel splits and fuel gas temperature, is input to the algorithm 16. Also input to the algorithm are reference parameters 14, which may include normalized load data, wheelspace temperature data, compressor discharge data, the dynamics amplitude function, dynamics frequency function, or other operational data. Within the algorithm 16, infrequent or frequent autotuning may be selected. If infrequent autotuning is selected, combustion dynamics are compared to a reference database. The reference database may contain combustion dynamics data from the past, conditioned on operation parameters similar to current operational parameters. Fuel split data may be included in parallel with this operational data, ensuring that the system's autotuning by adjusting the fuel splits is taken into account. This compels the autotuning system to compare dynamics signatures for a similar tuning state. If frequent autotuning is selected, the autotuning algorithm may be somewhat inverted. The dynamics signatures may be used as inputs 12 in parallel with operational data, and the algorithm 16 compares current fuel splits from the past wherein the unit exhibited similar dynamics signatures with similar operation data. Presented as an output 18 is H, wherein H is indicative of the overall health of the combustor. According to certain embodiments, H may be a function of the combustor and frequency band only. Health, H, may be a measure of the deviation of combustor dynamics from observable norms given similar operating conditions. Given a populated reference database comprising load data, fuel splits, time of day, load ramp rate, and an observable parameter, which may be, for example, combustor temperature and/or pressure data, which may be a function of time and band, these parameters may be averaged over a given time window, $T_{avg}$. This averaging across a window can be smoothing the data. Typical variation of a given combustor, c, may be calculated from observable data, by determining the average observable for all combustors excluding c, determining the average observable for all combustors, and taking the difference. Heath, H, of a given combustor as a function of time, may be determined by comparing the observable data for a given combustor, given a sufficiently similar vector comprising at least one of load data, fuel splits, time of day, load ramp rate within a given lookback time, with the average, given the expected typical variation.
Figure 2:
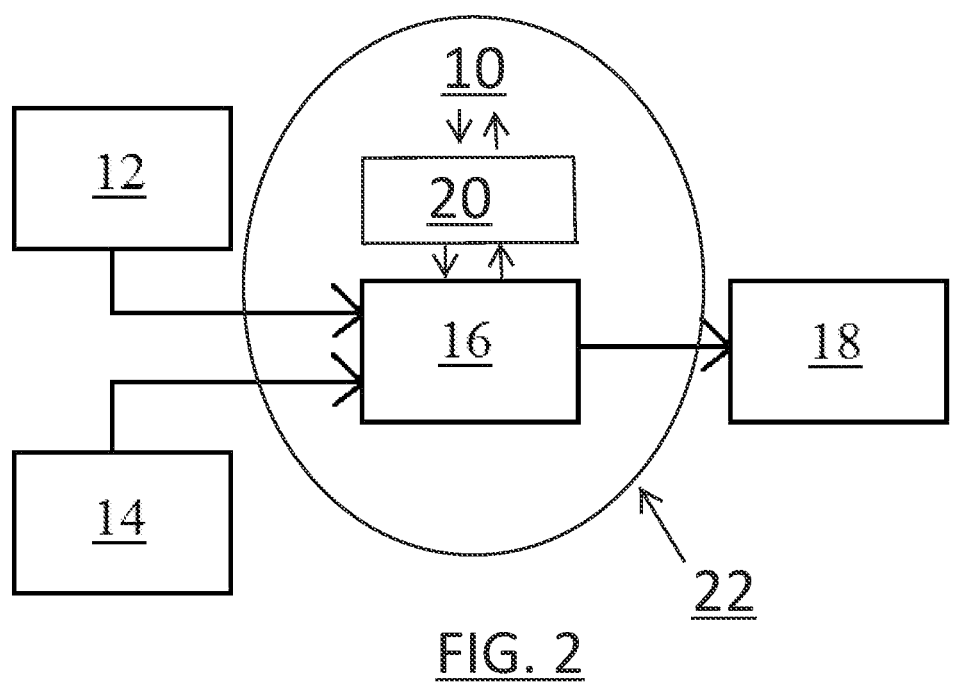
FIG. 2 is a block diagram showing a computer system 22 comprising a microprocessor 20 coupled to the instructions 10 on the non-transitory computer readable medium. Input data 12, which may include fuel splits and fuel gas temperature, is input to the algorithm 16. Also input to the algorithm are reference parameters 14, which may include normalized load data, wheelspace temperature data, compressor discharge data, the dynamics amplitude function, dynamics frequency function, or other operational data. Presented as an output 18 is H, wherein H is indicative of the overall health of the combustor. According to certain embodiments, H may be a function of the combustor and frequency band only. Health, H, may be a measure of the deviation of combustor dynamics from observable norms given similar operating conditions.
Figure 3:
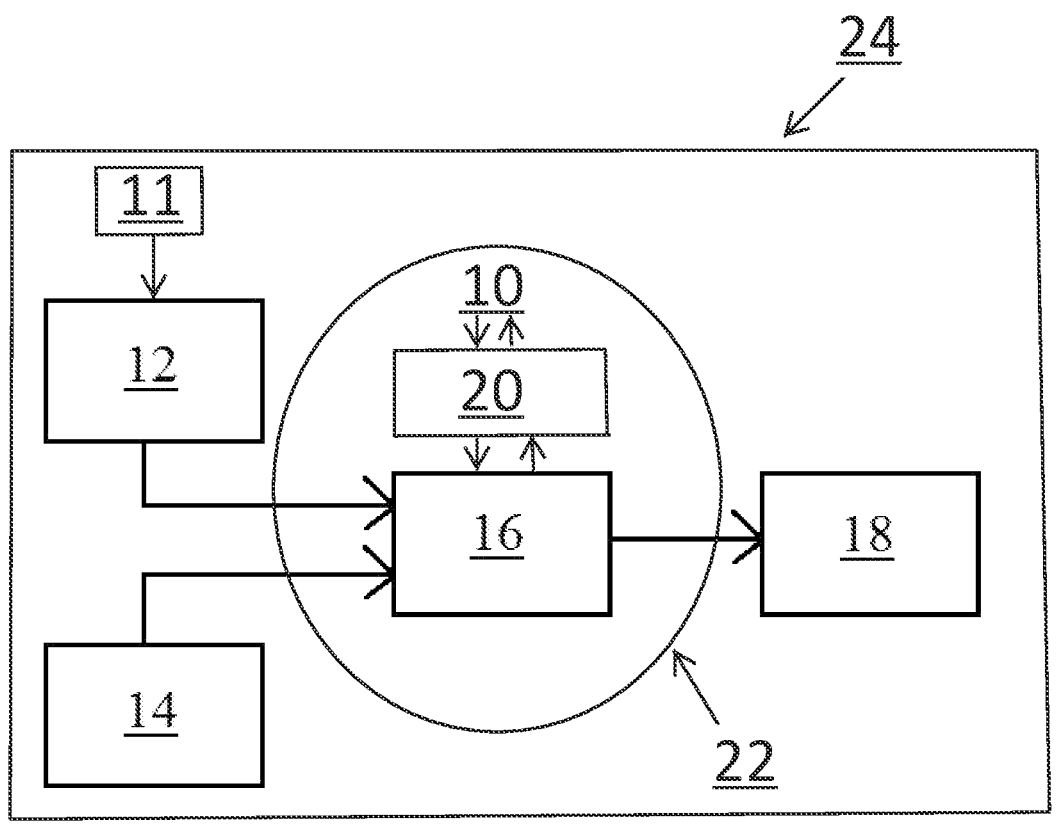
FIG. 3 is a block diagram showing a gas turbine system 24 comprising a computer system 22 having a microprocessor 20 coupled to the instructions 10 on the non-transitory computer readable medium. Input data 12, which may include fuel splits and fuel gas temperature, is input to the algorithm 16. Autotuning system 11 generates input data 12. Also input to the algorithm are reference parameters 14, which may include normalized load data, wheelspace temperature data, compressor discharge data, the dynamics amplitude function, dynamics frequency function, or other operational data. Presented as an output 18 is H, wherein H is indicative of the overall health of the combustor. According to certain embodiments, H may be a function of the combustor and frequency band only. Health, H, may be a measure of the deviation of combustor dynamics from observable norms given similar operating conditions.

It will be understood that the embodiments described herein are merely exemplary, and that one skilled in the art may make variations and modifications without departing from the spirit and scope of the invention. All such variations and modifications are intended to be included within the scope of the invention as described and claimed herein. Further, all embodiments disclosed are not necessarily in the alternative, as various embodiments of the invention may be combined to provide the desired result.

We claim:

1. A non-transitory computer readable medium with instructions stored thereon, the instructions executable by one or more processors for:
selecting infrequent or frequent autotuning of a combustor having a combustion dynamics monitoring (CDM) algorithm having the capability to detect combustion system fault precursors, wherein the non-transitory computer readable medium is configured to be switchable between infrequent or frequent autotuning of the combustor; and
determining the health of the combustor, wherein said determining the health of the combustor comprises receiving real-time fuel gas temperature data from at least one thermocouple, wherein said determining the health of the combustor comprises comparing the real-time combustor fuel split data and fuel gas temperature data with data in a reference database.

2. The non-transitory computer readable medium of claim 1, wherein the reference database comprises at least one data set selected from the group consisting of normalized load data, wheelspace temperature data, compressor discharge temperature data, dynamics amplitude data, and dynamics frequency data.

3. The non-transitory computer readable medium of claim 2, wherein said determining the health of a combustor comprises comparing the real-time combustor fuel split data and fuel gas temperature data with data in a reference database, wherein the reference database comprises normalized load data, wheelspace temperature data, compressor discharge temperature data, dynamics amplitude data, and dynamics frequency data.

4. The non-transitory computer readable medium of claim 1, wherein infrequent autotuning is selected, wherein said determining the health of a combustor comprises comparing real time combustion dynamics data and fuel split data with a reference database.

5. The non-transitory computer readable medium of claim 4, wherein the reference database is configured to be updated by real time combustion dynamics data and fuel split data.

6. The non-transitory computer readable medium of claim 1, wherein frequent autotuning is selected, wherein said determining the health of a combustor comprises comparing real time fuel split data with a fuel split reference database.

7. The non-transitory computer readable medium of claim 6, wherein said comparing real time fuel split data with a fuel split reference database comprises selecting data for comparison from the fuel split reference database wherein the combustor exhibited at least one data set similar to data selected from the group consisting of normalized load data, wheelspace temperature data, compressor discharge temperature data, dynamics amplitude data, and dynamics frequency data.

8. The non-transitory computer readable medium of claim 1, wherein said determining the health of a combustor comprises outputting a single number H, wherein H is indicative of the overall health of the combustor.

9. A computer system comprising at least one microprocessor coupled to memory and the non-transitory computer readable medium of claim 1, wherein the computer system is configured to receive input data from a plurality of thermocouples.

10. A method of monitoring a combustor within a gas turbine engine system, comprising:
providing a gas turbine engine system;
selecting infrequent or frequent autotuning of the combustor having a combustion dynamics monitoring (CDM) algorithm having the capability to detect combustion system fault precursors, wherein the non-transitory computer readable medium is configured to be switchable between infrequent or frequent autotuning of the combustor; and
determining the health of the combustor;

wherein said determining the health of the combustor comprises receiving real-time fuel gas temperature data from at least one thermocouple.

11. The method of claim 10, wherein said determining the health of a combustor comprises receiving real-time combustor fuel split data.

12. The method of claim 11, wherein said determining the health of a combustor comprises comparing the real-time combustor fuel split data and fuel gas temperature data with data in a reference database, wherein the reference database comprises at least one data set selected from the group consisting of normalized load data, wheelspace temperature data, compressor discharge temperature data, dynamics amplitude data, and dynamics frequency data.

13. The method of claim 12, wherein said determining the health of a combustor comprises comparing the real-time combustor fuel split data and fuel gas temperature data with data in a reference database, wherein the reference database comprises normalized load data, wheelspace temperature data, compressor discharge temperature data, dynamics amplitude data, and dynamics frequency data.

14. The method of claim 10, wherein infrequent autotuning is selected, wherein said determining the health of a combustor comprises comparing real time combustion dynamics data and fuel split data with a reference database.

15. The method of claim 14, wherein the reference database is configured to be updated by real time combustion dynamics data and fuel split data.

16. The method of claim 14, wherein frequent autotuning is selected, wherein said determining the health of a combustor comprises comparing real time fuel split data with a fuel split reference database.

17. The method of claim 16, wherein said comparing real time fuel split data with a fuel split reference database comprises selecting data for comparison from the fuel split reference database wherein the combustor exhibited at least one data set similar to data selected from the group consisting of normalized load data, wheelspace temperature data, compressor discharge temperature data, dynamics amplitude data, and dynamics frequency data.

18. The method of claim 10, wherein said determining the health of a combustor comprises outputting a single number H, wherein H is indicative of the overall health of the combustor, wherein the non-transitory computer readable medium is configured to be switchable between infrequent or frequent autotuning of a combustor, wherein said determining the health of a combustor comprises receiving real-time fuel gas temperature data from a plurality of thermocouples.

* * * * *